US010829095B2

(12) United States Patent
Sato

(10) Patent No.: US 10,829,095 B2
(45) Date of Patent: Nov. 10, 2020

(54) WASHER TANK

(71) Applicant: MURAKAMI CORPORATION, Shizuoka (JP)

(72) Inventor: Hidenori Sato, Shizuoka (JP)

(73) Assignee: MURAKAMI CORPORATION, Shizuoka (JP)

( * ) Notice: Subject to any disclaimer, the term of this patent is extended or adjusted under 35 U.S.C. 154(b) by 0 days.

(21) Appl. No.: 16/083,702

(22) PCT Filed: Mar. 1, 2017

(86) PCT No.: PCT/JP2017/008157
§ 371 (c)(1),
(2) Date: Sep. 10, 2018

(87) PCT Pub. No.: WO2017/159368
PCT Pub. Date: Sep. 21, 2017

(65) Prior Publication Data
US 2019/0111894 A1    Apr. 18, 2019

(30) Foreign Application Priority Data

Mar. 18, 2016  (JP) .................... 2016-054916

(51) Int. Cl.
| | | |
|---|---|---|
| *B60S 1/50* | (2006.01) | |
| *F24H 1/20* | (2006.01) | |
| *F24H 1/18* | (2006.01) | |
| *B60S 1/24* | (2006.01) | |
| *B60S 1/48* | (2006.01) | |
| *B60S 1/52* | (2006.01) | |

(52) U.S. Cl.
CPC . *B60S 1/50* (2013.01); *B60S 1/24* (2013.01); *B60S 1/487* (2013.01); *B60S 1/488* (2013.01);
(Continued)

(58) Field of Classification Search
CPC .......... F24H 1/182; F24H 1/201; F24H 1/202; F24H 1/203; Y10T 137/6606;
(Continued)

(56) References Cited

U.S. PATENT DOCUMENTS 2,635,173 A * 4/1953 Radi ..................... F24H 1/202
                                                    392/456
4,578,565 A * 3/1986 Dawidowitch ....... F24H 9/0021
                                                    122/19.1
(Continued)

FOREIGN PATENT DOCUMENTS

| JP | 55-25657 | 2/1980 |
|----|----------|--------|
| JP | 55-85352 | 6/1980 |

(Continued)

OTHER PUBLICATIONS

Translation of Official Communication issued in International Bureau of WIPO Patent Application No. PCT/JP2017/008157, dated Sep. 27, 2018.
(Continued)

*Primary Examiner* — Atif H Chaudry
(74) *Attorney, Agent, or Firm* — Greenblum & Bernstein, P.L.C.

(57) ABSTRACT

A washer tank according to an embodiment includes: a first container which stores a washer fluid and retains a temperature of the washer fluid; an inflow pipe through which the washer fluid flows into a storage space in the first container; an outflow pipe through which the washer fluid flows out of the first container from the storage space; and a heating portion which heats the washer fluid, in which all the inflow pipe, the outflow pipe, and the heating portion are disposed in a lower portion of the first container.

18 Claims, 2 Drawing Sheets

(52) U.S. Cl.
CPC ............. *F24H 1/182* (2013.01); *F24H 1/201* (2013.01); *F24H 1/202* (2013.01); *F24H 1/203* (2013.01); *B60S 1/52* (2013.01); *Y10T 137/6606* (2015.04); *Y10T 137/86332* (2015.04)

(58) Field of Classification Search
CPC .. Y10T 137/86332; B60S 1/488; B60S 1/487; B60S 9/002; B60S 1/24
See application file for complete search history.

(56) References Cited

U.S. PATENT DOCUMENTS 4,637,347 A * 1/1987 Troy ................. F24D 3/082
122/15.1
6,321,036 B1 * 11/2001 Huang ............... F24H 1/202
392/441

FOREIGN PATENT DOCUMENTS

| | | |
|---|---|---|
| JP | 61-203156 | 12/1986 |
| JP | 63-305060 | 12/1988 |
| JP | 63-306953 | 12/1988 |
| JP | 2-53656 | 2/1990 |
| JP | 7-223510 | 8/1995 |
| JP | 2006-160103 | 6/2006 |
| JP | 2010-234871 | 10/2010 |
| WO | 2007/010538 | 1/2007 |

OTHER PUBLICATIONS

Official Communication issued in International Bureau of WIPO Patent Application No. PCT/JP2017/008157, dated May 30, 2017.

* cited by examiner

WASHER TANK

TECHNICAL FIELD

The present disclosure relates a washer tank which stores a washer fluid.

BACKGROUND ART

Hitherto, a washer fluid which is sprayed onto a front glass for the purpose of dissolving frost adhered to the front glass of a vehicle is known. The washer fluid is stored in a washer tank mounted in a vehicle or the like. In Japanese Unexamined Utility Model Publication No. S61-203156, a water heater for cleaning an automobile front glass is described. The water heater for cleaning an automobile front glass includes a water tank that stores a washer fluid, a water supply port through which the washer fluid flows into the water tank, a water suction pipe and a water transport pipe through which the washer fluid flows out of the water tank from the inside of the water tank, and a heater that heats the washer fluid. The water suction pipe is immersed in the washer fluid inside the water tank, and the water transport pipe is connected to the upper side of the water suction pipe via an electric pump. The water supply port and the water transport pipe penetrate through the wall surface of the upper side of the water tank.

In Japanese Unexamined Patent Publication No. 2010-234871, a washer tank for a vehicle is described. The washer tank includes a storage chamber which stores a washer fluid, an inflow pipe through which the washer fluid flows into the storage chamber, and a tubular ventilation portion through which air flows into and out of the storage chamber. The ventilation portion penetrates the wall surface of the upper side of the storage chamber, and air flows in and out at the upper end of the ventilation portion.

CITATION LIST

Patent Literature

Patent Literature 1: Japanese Unexamined Utility Model Publication No. S61-203156
Patent Literature 2: Japanese Unexamined Patent Publication No. 2010-234871

SUMMARY OF INVENTION

Technical Problem

The washer fluid stored in the washer tank is used for the purpose of dissolving frost or the like. Therefore, in the washer tank, the washer fluid is required to flow out in a state of having a high temperature. However, in the water heater for cleaning an automobile front glass described above, a water supply pipe and the water transport pipe penetrate through the wall surface of the upper side of the water tank. In addition, in the washer tank described above, the ventilation portion penetrates through the wall surface of the upper side of the storage chamber. In a case where the water supply pipe, the water transport pipe, or the ventilation portion penetrates through the wall surface of the upper side, the heat of the washer fluid escapes upward from the water supply pipe, the water transport pipe, the ventilation portion, or the like. Therefore, a problem that the temperature of the washer fluid decreases may be incurred.

The present disclosure describes a washer tank capable of suppressing a decrease in the temperature of a washer fluid flowing out of a container.

Solution to Problem

A washer tank according to an embodiment of the present disclosure includes: a first container which stores a washer fluid and retains a temperature of the washer fluid; an inflow pipe through which the washer fluid flows into a storage space in the first container; an outflow pipe through which the washer fluid flows out of the first container from the storage space; and a heating portion which heats the washer fluid, in which all the inflow pipe, the outflow pipe, and the heating portion are disposed in a lower portion of the first container.

The washer tank includes the first container which stores the washer fluid and the heating portion which heats the washer fluid in the storage space inside the first container, and the heater is disposed in the lower portion of the first container. Therefore, the washer fluid heated by the heating portion rises in the storage space inside the first container. The washer fluid heated to a high temperature as described above can be stored on the upper side of the storage space. In addition, the inflow pipe through which the washer fluid flows into the storage space inside the first container, the outflow pipe through which the washer fluid in the storage space flows out of the first container, and the heating portion are disposed in the lower portion of the first container. Therefore, since the washer fluid at a high temperature can be stored on the upper side of the storage space, by disposing the inflow pipe, the outflow pipe, and the heating portion in the lower portion of the first container, it is possible to cause heat from the washer fluid to be less likely to escape to the outside of the first container. Therefore, the washer fluid at a high temperature can be held on the upper side of the storage space, so that it is possible to cause heat of the washer fluid to be less likely to escape from the upper side of the storage space. Therefore, the decrease in the temperature of the washer fluid in the storage space can be suppressed. Accordingly, the decrease in the temperature of the washer fluid flowing out of the container can be suppressed.

In addition, a second container that surrounds the first container from the outside and blocks heat from the first container may be further included. In this case, since the second container blocks the heat from the first container, it is possible to cause the heat from the first container to be less likely to escape, so that it is possible to further enhance the heat retaining effect of the washer fluid. Therefore, since the second container is further included, even in a case where the washer tank is used in a cold region, the washer fluid at a high temperature can be stored on the upper side of the storage space, so that it is possible to cause the heat of the washer fluid to be less likely to escape to the outside. Therefore, even in a case of use in a cold region, the washer fluid at a high temperature can be stored in the storage space, so that it is possible to more reliably suppress the decrease in the temperature of the washer fluid flowing out of the container.

In addition, an air release pipe through which air flows out of the first container from an air layer formed above the storage space may be further included, and the air release pipe may extend downward from the air layer and be drawn from the lower portion of the first container to the outside of the first container. In this case, the air can be caused to flow out of the first container by the air release pipe, so that the washer fluid can be caused to smoothly flow into the storage space while releasing the air. In addition, since the air release pipe is drawn from the lower portion of the first container to the outside of the first container, the temperature of the washer fluid can be reliably retained on the upper side of the first container. Therefore, it is possible to cause the heat of the washer fluid to be less likely to escape to the outside of the first container, so that it is possible to suppress the decrease in the temperature of the washer fluid in the storage space. Therefore, it is possible to suppress the decrease in the temperature of the washer fluid flowing out of the container.

In addition, the air release pipe may be drawn to the outside of the first container in a state of being accommodated in the inflow pipe. By accommodating the air release pipe in the inflow pipe as described above, the number of components and the like for fixing the air release pipe can be reduced. Therefore, an attachment structure of the air release pipe can be simplified.

In addition, a heat retaining base which retains a temperature of the first container at a lower end of the first container may be further included. In this case, the temperature of the lower portion of the first container in which the inflow pipe, the outflow pipe, and the heating portion are disposed can be retained, and the heat retaining effect of the washer fluid in the storage space can be enhanced. Therefore, it is possible to more effectively suppress the decrease in the temperature of the washer fluid.

Advantageous Effects of Invention

According to the present disclosure, it is possible to suppress the decrease in the temperature of the washer fluid flowing out of the container.

DESCRIPTION OF EMBODIMENTS

Hereinafter, an embodiment of a washer tank according to the present disclosure will be described with reference to the drawings. In the description of the drawings, the same reference numbers are assigned to the same components or to similar components, and overlapping descriptions will be omitted.

Figure 1:
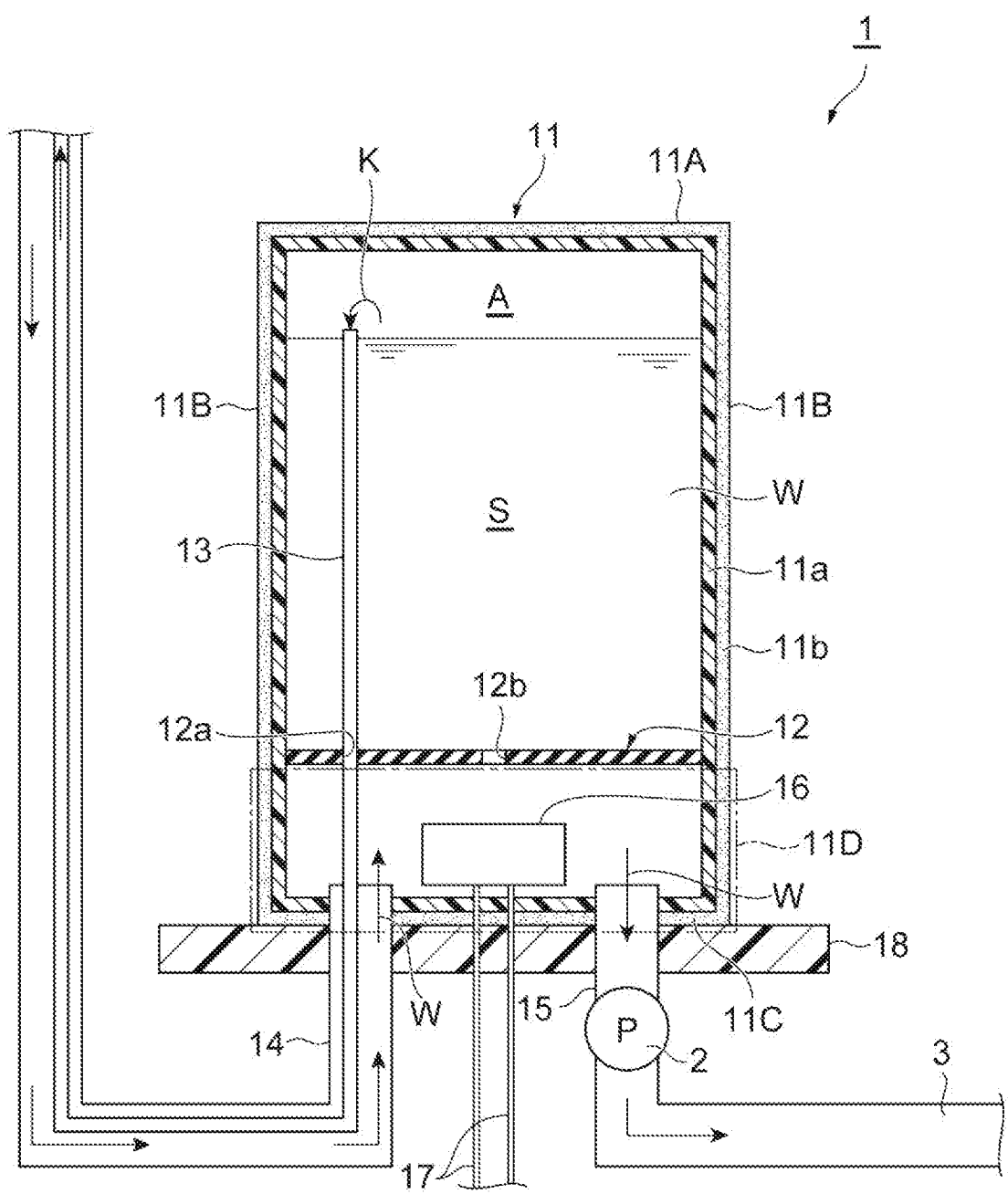
FIG. 1 is a longitudinal sectional view illustrating a washer tank according to an embodiment.

As illustrated in FIG. 1, for example, a washer tank 1 according to the embodiment is applied to a washer fluid supply system of a vehicle. The washer tank 1 stores a washer fluid W. The supply system includes a washer fluid pump 2 provided on the outlet side of the washer tank 1, a pipe line 3 extending from the washer fluid pump 2, and a washer fluid nozzle connected to a side of the pipe line 3 opposite to the washer fluid pump 2. The washer fluid nozzle is disposed to face the front window glass of the vehicle. The washer fluid pump 2 is operated, for example, by an operation of a driver or the like of the vehicle, and by the operation, the washer fluid W is caused to flow into the washer fluid nozzle.

The washer tank 1 includes a first container 11 formed in, for example, a vertically elongated rectangular parallelepiped shape, and the washer fluid W is stored in a storage space S inside the first container 11. The first container 11 has an upper surface portion 11A, four side surface portions 11B, and a lower surface portion 11C. All the upper surface portion 11A, the four side surface portions 11B, and the lower surface portion 11C have a flat plate shape.

Each of the upper surface portion 11A, the side surface portions 11B, and the lower surface portion 11C includes a resin layer 11a positioned inside the first container 11 and a foam heat insulation layer 11b covering the resin layer 11a from the outside. The material of the resin layer 11a is, for example, polypropylene (PP). As the foam heat insulation layer 11b, an expanded polystyrene molded product is used. Since the first container 11 is formed with the resin layer 11a and the foam heat insulation layer 11b as described above, the heat retaining performance of the storage space S for the washer fluid W can be enhanced.

The storage space S is provided with a deflector 12 that vertically partitions the storage space S. The deflector 12 functions as a flow guide plate for the washer fluid W. The deflector 12 is supported so as to be in contact with the inner wall surface of the first container 11 in the storage space S. The deflector 12 is made of a rubber material such as ethylene propylene diene monomer (EPDM).

The deflector 12 has a pipe holding hole 12a which holds an air release pipe 13, which will be described later, in a state of being inserted therethrough, and a hole 12b through which the washer fluid W passes vertically. Both the pipe holding hole 12a and the hole 12b penetrate vertically. The positions of the pipe holding hole 12a and the hole 12b can be appropriately changed in a plan view. The deflector 12 is disposed, for example, at a position at which the distance from the lower end of the first container 11 to the deflector 12 (the height of the deflector 12) is about ¼ of the overall height of the first container 11. However, the disposition of the deflector 12 can be appropriately changed.

An inflow pipe 14, an outflow pipe 15, and a heater 16 (heating portion) are disposed on the lower side of the storage space S partitioned by the deflector 12. The inflow pipe 14 causes the washer fluid W to flow into the storage space S, and the outflow pipe 15 causes the washer fluid W to flow out of the first container 11 from the storage space S. The heater 16 heats the washer fluid W.

As the heater 16, various liquid heating heaters can be used. The type, shape, and disposed form of the heater 16 are not particularly limited. Wires 17 for supplying power to the heater 16 extend from the heater 16, and the wires 17, the inflow pipe 14, and the outflow pipe 15 penetrate the lower surface portion 11C. On the other hand, the upper surface portion 11A and the side surface portions 11B do not have penetrated portions.

All the inflow pipe 14, the outflow pipe 15, and the heater 16 are disposed in a lower portion 11D of the first container 11. Here, in this specification, the "lower part of the first container" includes the lower surface portion of the first container, and lower side parts of the side surface portions of the first container (parts below the center position in the vertical direction of the side surface portion). In the embodiment, the lower portion 11D of the first container 11 indicates a part below the deflector 12. The inflow pipe 14, the outflow pipe 15, and the heater 16 are disposed in the lower portion 11D.

The inflow pipe 14 and the outflow pipe 15 protrude upward from the lower surface portion 11C of the first container 11. In addition, the air release pipe 13 is accommodated in the inflow pipe 14. The air release pipe 13, the inflow pipe 14, and the outflow pipe 15 are made of; for example, EPDM. When the washer fluid W flows into the storage space S from the inflow pipe 14, the air release pipe 13 allows the air K to escape from an air layer A above the storage space S. Accordingly, a smooth inflow of the washer fluid W is enabled. The air release pipe 13 extends downward from the air layer A, penetrates vertically through the deflector 12, and is drawn from the lower surface portion 11C of the first container 11 to the outside of the first container 11. In addition, the air release pipe 13 is drawn to the outside of the first container 11 in a state of being accommodated in the inflow pipe 14.

The outflow of the washer fluid W from the outflow pipe 15 is controlled such that the volume of the washer fluid W in the storage space S becomes 90% or less of the capacity of the storage space S. Accordingly, the air layer A is formed above the storage space S. Therefore, even if the washer fluid W in the storage space S freezes and expands, breakage of the first container 11 is reliably prevented.

A heat retaining base 18 which retains the temperature of the first container 11 is fixed to the lower surface portion 11C of the first container 11. The heat retaining base 18 is formed, for example, in a flat plate shape. The material of the heat retaining base 18 is a resin material such as PP. The thickness of the heat retaining base 18 is larger than the thickness of the lower surface portion 11C. The inflow pipe 14, the wires 17, and the outflow pipe 15 described above vertically penetrate through the heat retaining base 18.

Figure 2:
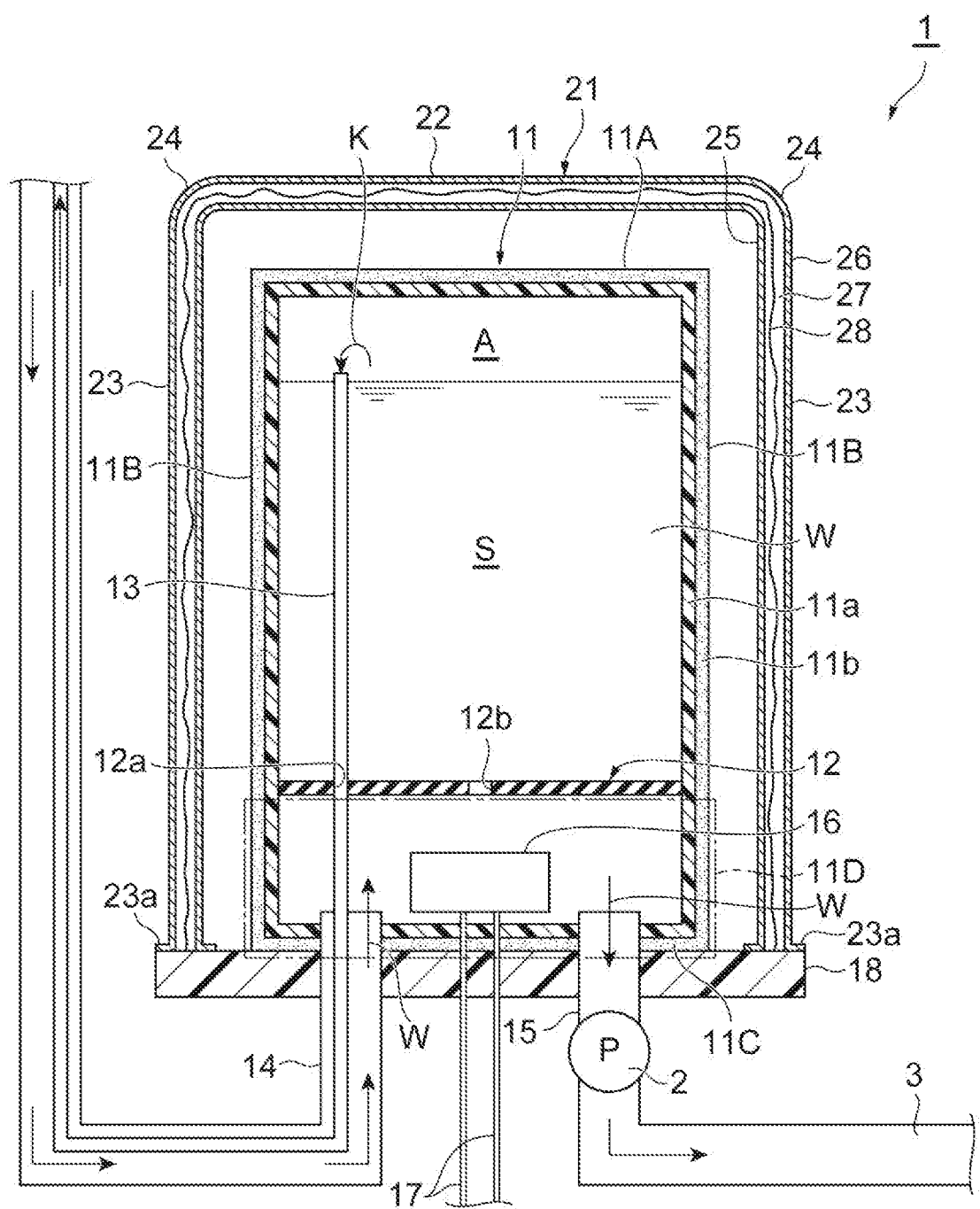
FIG. 2 is a longitudinal sectional view illustrating a state in which a second container is attached to the washer tank of FIG. 1.

As illustrated in FIG. 2, a second container 21 that surrounds the first container 11 from the outside and blocks heat from the first container 11 is further fixed to the heat retaining base 18. The second container 21 is a container which is additionally attached, for example, when the washer tank 1 is used in a cold region. The second container 21 can be retrofitted in a case where further warming of the washer fluid W is needed.

The second container 21 is formed, for example, in a tubular shape with a bottom, and has an upper surface portion 22 and side surface portions 23. The upper surface portion 22 and the side surface portions 23 are formed, for example, in a flat plate shape. The side surface portion 23 extends downward from a rounded outer edge portion 24. The lower end of the side surface portion 23 is fixed to the heat retaining base 18 by inserting a bolt through a flange portion 23a and fastening the bolt to the heat retaining base 18.

The second container 21 has a double structure like a thermos bottle, and has a heat insulation structure for retaining the temperature of the first container 11. The second container 21 includes an inner wall 25, an outer wall 26, a vacuum layer 27 formed between the inner wall 25 and the outer wall 26, and a copper foil 28 disposed in the vacuum layer 27. For example, the inner wall 25 is made of metal such as stainless steel or glass plated with metal. The outer wall 26 is formed of metal such as stainless steel.

By disposing the copper foil 28 in the vacuum layer 27 formed between the inner wall 25 and the outer wall 26, radiation of the heat from the first container 11 is suppressed, and thus the heat retaining property of the first container 11 and the washer fluid W can be enhanced. The copper foil 28 may be attached to the inner side surface of the inner wall 25 or the outer side surface of the outer wall 26 other than to the vacuum layer 27. Furthermore, instead of the copper foil 28, for example, a sheet-like member formed of silver plating may be disposed.

Next, the function and effect of the washer tank 1 according to the present embodiment will be described.

The washer tank 1 includes the first container 11 which stores the washer fluid W and the heater 16 which heats the washer fluid W in the storage space S inside the first container 11, and the heater 16 is disposed in the lower portion 11D of the first container 11. Therefore, the washer fluid W heated by the heater 16 rises in the storage space S inside the first container 11. The washer fluid W heated to a high temperature as described above can be stored on the upper side of the storage space S.

The inflow pipe 14 through which the washer fluid W flows into the storage space S inside the first container 11, the outflow pipe 15 through which the washer fluid W in the storage space S flows out of the first container 11, and the heater 16 are disposed in the lower portion 11D of the first container 11. Therefore, the washer fluid W at a high temperature can be stored on the upper side of the storage space S. In addition, by disposing the inflow pipe 14, the outflow pipe 15, and the heater 16 in the lower portion 11D of the first container 11, it is possible to cause heat from the washer fluid W to be less likely to escape to the outside of the first container 11.

Therefore, the washer fluid W at a high temperature can be held on the upper side of the storage space S, so that it is possible to cause heat of the washer fluid W to be less likely to escape from the upper side of the storage space S. Therefore, the decrease in the temperature of the washer fluid W in the storage space S can be suppressed. Accordingly, the decrease in the temperature of the washer fluid W flowing out of the first container 11 can be suppressed.

Furthermore, in the embodiment, the part of the lower side where the inflow pipe 14 and the outflow pipe 15 are provided, and the part of the upper side without penetrated parts are partitioned by the deflector 12. Therefore, the temperature of the washer fluid W of the part of the upper side can be more reliably retained, and it is possible to cause the heat of the washer fluid W in the part of the lower side to be less likely to escape. Therefore, the decrease in the temperature of the washer fluid W of the storage space S can be more reliably suppressed.

Furthermore, in the embodiment, the inflow pipe 14 and the outflow pipe 15 are disposed in the lower surface portion 11C of the first container 11. Furthermore, the upper surface portion 11A and the side surface portion 11B of the first container 11 do not have penetrated parts. Therefore, it is possible to more reliably suppress the escape of the heat from the washer fluid W, and it is possible to enhance the heat retaining effect on the washer fluid W.

In addition, the washer tank 1 further includes the second container 21 that surrounds the first container 11 from the outside and blocks heat from the first container 11. Therefore, since the second container 21 blocks the heat from the first container 11, it is possible to cause the heat from the first container 11 to be less likely to escape, so that it is possible to further enhance the heat retaining effect of the washer fluid W.

Therefore, since the second container 21 is further included, even in a case where the washer tank 1 is used in a cold region, the washer fluid W at a high temperature can be stored on the upper side of the storage space S, so that it is possible to cause the heat of the washer fluid W to be less likely to escape to the outside. Therefore, even in a case of use in a cold region, the washer fluid W at a high temperature can be stored in the storage space S, so that it is possible to more reliably suppress the decrease in the temperature of the washer fluid W flowing out of the container.

In addition, since the second container 21 is attached to the heat retaining base 18 by the bolt, attachment to the heat retaining base 18 is facilitated. Furthermore, since the second container 21 is attached by retrofitting, it is possible to attach the second container 21 in a cold region without attaching the second container 21 in a place other than a cold region. That is, it is possible to select whether or not to attach the second container 21 depending on the place for use.

The washer tank 1 also includes the air release pipe 13 through which the air K flows out of the first container 11 from the air layer A formed above the storage space S. The air release pipe 13 extends downward from the air layer A and is drawn from the lower portion 11D of the first container 11 to the outside of the first container 11. Therefore, the air K can be caused to flow out of the first container 11 by the air release pipe 13, so that the washer fluid W can be caused to smoothly flow into the storage space S while releasing the air K.

In addition, since the air release pipe 13 is drawn from the lower portion 11D of the first container 11 to the outside of the first container 11, the temperature of the washer fluid W can be reliably retained on the upper side of the first container 11. Therefore, it is possible to cause the heat of the washer fluid W to be less likely to escape to the outside of the first container 11, so that it is possible to suppress the decrease in the temperature of the washer fluid W in the storage space S. Therefore, it is possible to suppress the decrease in the temperature of the washer fluid W flowing out of the first container 11.

In addition, the air release pipe 13 is drawn to the outside of the first container 11 in a state of being accommodated in the inflow pipe 14. By accommodating the air release pipe 13 in the inflow pipe 14 as described above, the number of components and the like for fixing the air release pipe 13 can be reduced. Therefore, an attachment structure of the air release pipe 13 can be simplified.

In addition, the washer tank 1 includes the heat retaining base 18 which retains the heat of the first container 11 at the lower end of the first container 11. Therefore, the temperature of the lower portion 11D of the first container 11 in which the inflow pipe 14, the outflow pipe 15, and the heater 16 are disposed can be retained, and the heat retaining effect of the washer fluid W in the storage space S can be enhanced. Therefore, it is possible to more effectively suppress the decrease in the temperature of the washer fluid W.

While the embodiment of the present disclosure has been described above, the present disclosure is not limited to the above-described embodiment, and can be modified within the scope in which the gist described in each of the claims is not changed or applied to other things. That is, the present disclosure can be modified in various manners in the scope in which the gist described in each of the claims is not changed.

For example, in the above-described embodiment, the first container 11 which includes the upper surface portion 11A, the side surface portions 11B, and the lower surface portion 11C and has the resin layer 11a and the foam heat insulation layer 11b has been described. However, the shape and material of the first container 11 can be appropriately changed. In addition, the shape and material of the second container 21, and the shape and material of the deflector 12 can also be appropriately changed.

Furthermore, in the above-described embodiment, an example in which the air release pipe 13 is drawn to the outside of the first container 11 in a state of being accommodated in the inflow pipe 14 has been described. However, the disposed form of the air release pipe 13 is not limited to the example above and can be appropriately changed. In addition, the shapes and materials of the air release pipe 13, the inflow pipe 14, and the outflow pipe 15 can also be appropriately changed.

In addition, in the above-described embodiment, an example in which the heat retaining base 18 that retains the temperature of the first container 11 is fixed to the lower surface portion 11C of the first container 11 has been described. However, the shape and material of the heat retaining base 18 can be appropriately changed. Furthermore, it is possible to omit the heat retaining base 18.

In the above-described embodiment, an example in which the washer tank 1 is disposed in the washer fluid supply system including the washer fluid pump 2 and the pipe line 3 has been described. However, the washer tank according to the present disclosure can also be applied to a supply system of a washer fluid different from the above description.

INDUSTRIAL APPLICABILITY

According to the present disclosure, it is possible to suppress a decrease in the temperature of a washer fluid flowing out of a container.

REFERENCE SIGNS LIST

1: washer tank, 2: washer fluid pump, 3: pipe line, 11: first container, 11A: upper surface portion, 11B: side surface portion, 11C: lower surface portion, 11D: lower portion, 11a: resin layer, 11b: foam heat insulation layer, 12: deflector, 12a: pipe holding hole, 12b: hole, 13: air release pipe, 14: inflow pipe, 15: outflow pipe, 16: heater, 17: wire, 18: heat retaining base, 21: second container, 22: upper surface portion, 23: side surface portion, 24: outer edge portion, 25: inner wall, 26: outer wall, 27: vacuum layer, 28: copper foil, A: air layer, K: air, S: storage space, W: washer fluid.

The invention claimed is:

1. A washer tank comprising:
a first container which stores a washer fluid and retains a temperature of the washer fluid;
an inflow pipe through which the washer fluid flows into a storage space in the first container;
an outflow pipe through which the washer fluid flows out of the first container from the storage space;
an air release pipe through which air flows out of the first container from an air layer formed above the storage space; and
a heating portion which heats the washer fluid,
wherein the inflow pipe, the outflow pipe, and the heating portion are disposed in a lower portion of the first container,
wherein the air release pipe extends downward from the air layer and is drawn from the lower portion of the first container to an outside of the first container,
wherein the air release pipe is drawn to the outside of the first container in a state of being accommodated in the inflow pipe.

2. The washer tank according to claim 1, further comprising;
a second container that surrounds the first container from the outside and blocks heat from the first container.

3. The washer tank according to claim 2,
wherein the second container comprises an inner wall, an outer wall and a vacuum layer formed between the inner wall and the outer wall,
wherein a copper foil is disposed in the vacuum layer.

4. The washer tank according to claim 1, further comprising:
a heat retaining base which retains a temperature of the first container at a lower end of the first container.

5. The washer tank according to claim 1,
wherein the lower portion of the first container is within approximately ¼ of a height of the first container.

6. The washer tank according to claim 1,
wherein the first container comprises a resin layer and a foam heat insulation layer covering the resin layer.

7. The washer tank according to claim 6,
wherein the resin layer comprises polypropylene (PP).

8. The washer tank according to claim 6,
wherein the foam heat insulation layer comprises an expanded polystyrene molded product.

9. The washer tank according to claim 1, further comprising;
a second container that surrounds the first container to block heat emitted from the first container; and
a heat retaining base located at a lower end of the first container to retain a temperature of the washer fluid,
wherein the second container is removably attached to the heat retaining base.

10. A washer tank comprising:
a storage container including a storage space to store a washer fluid, the storage container including a vertical wall;
a deflector extending from the vertical wall to vertically partition the storage space;
an inflow pipe to direct the washer fluid into the storage space;
an outflow pipe to direct the washer fluid out of the storage space;
a heating portion located in the storage space to heat the washer fluid; and
an air release pipe extending from an upper portion of the storage container, to release air from an air layer formed above the washer fluid,
wherein the deflector comprises a pipe holding hole that accommodates the air release pipe.

11. The washer tank according to claim 10,
wherein the deflector delimits a lower portion of the storage space, and
wherein the inflow pipe has an opening end located in the lower portion of the storage space, the outflow pipe has an opening end located in the lower portion of the storage space, and the heating device is located in the lower portion of the storage space.

12. The washer tank according to claim 10,
wherein the deflector is positioned adjacent to the opening end of the inflow pipe and adjacent to the opening end of the outflow pipe to guide a flow of the washer fluid in the storage container.

13. The washer tank according to claim 10,
wherein the deflector extends from an inner wall surface of the vertical wall of the storage container.

14. The washer tank according to claim 10,
wherein a material of the deflector comprises a rubber material.

15. The washer tank according to claim 14,
wherein the rubber material comprises an ethylene propylene diene monomer (EPDM).

16. The washer tank according to claim 10,
wherein the deflector comprises a hole to allow a passage of the washer fluid.

17. The washer tank according to claim 10,
wherein the deflector is positioned such that a distance between a lower end of the storage container and the deflector is approximately ¼ of a height of the storage container.

18. The washer tank according to claim 10,
wherein the deflector includes a plate that extends substantially horizontally in the storage space.

* * * * *